P. ULYSSE.
NATURAL COLOR CINEMATOGRAPHY.
APPLICATION FILED JAN. 19, 1914.
1,161,910.
Patented Nov. 30, 1915.
2 SHEETS—SHEET 1.
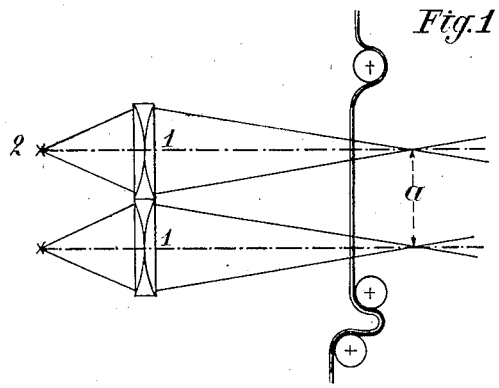 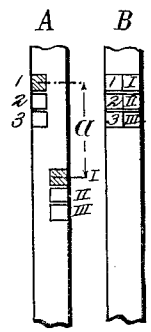
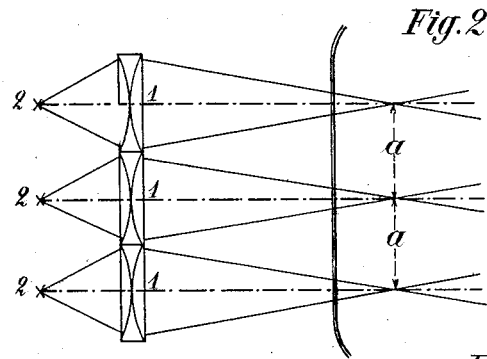 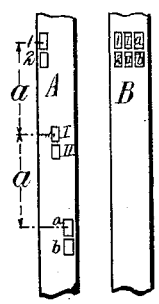
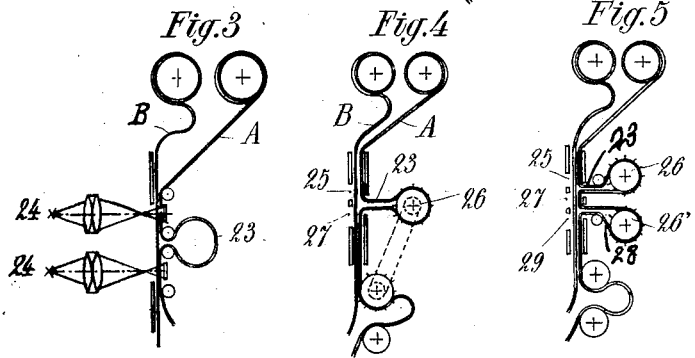 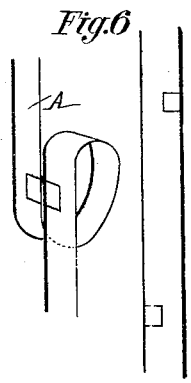
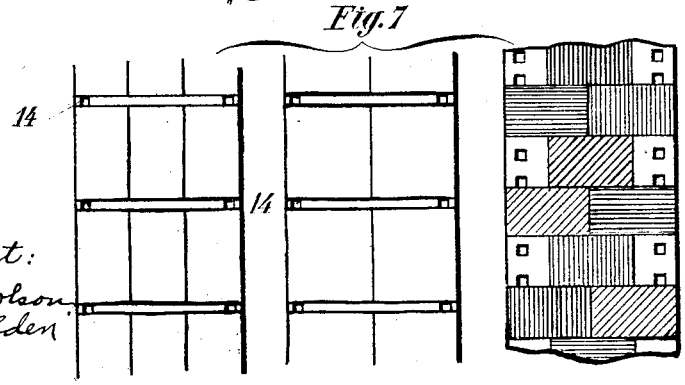
Attest:
Ewd L. Tolson
H. L. Alden
Inventor:
Pierre Ulysse,
by Henry Middleton
Donaldson & Year

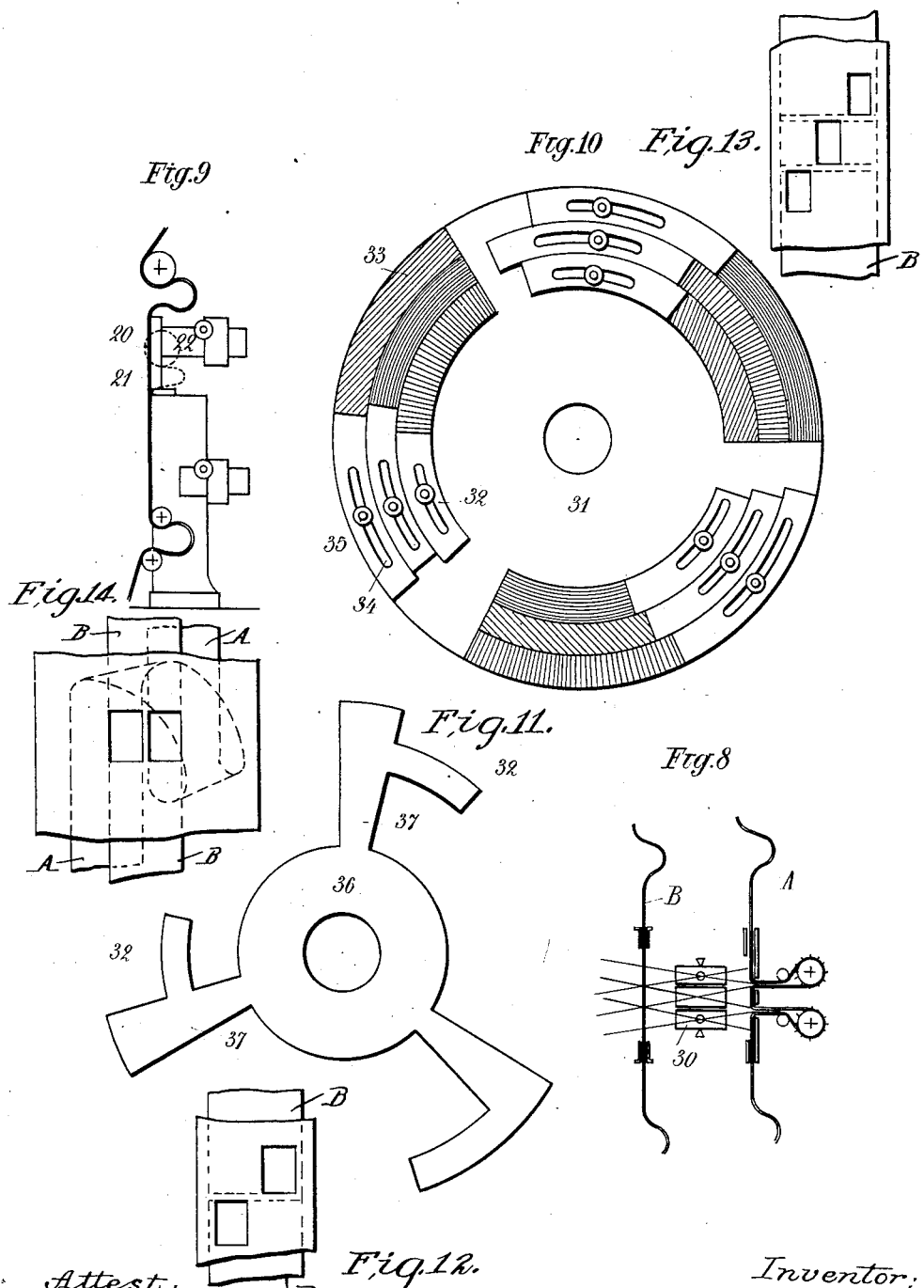

UNITED STATES PATENT OFFICE.

PIERRE ULYSSE, OF MARSEILLE, FRANCE.

NATURAL-COLOR CINEMATOGRAPHY.

1,161,910.     Specification of Letters Patent.     Patented Nov. 30, 1915.

Application filed January 19, 1914. Serial No. 813,068.

*To all whom it may concern:*

Be it known that I, PIERRE ULYSSE, a citizen of the French Republic, residing in Marseille, France, have invented certain new and useful Improvements in Natural-Color Cinematography, of which the following is a specification.

The present invention relates to a printing device by which a positive film with $n$ selected images having a longitudinal and lateral displacement can be obtained from a negative film with $n$ selected images grouped on the area of an ordinary black and white image. The simultaneous illumination of the $n$ selected images by $n$ luminous sources enables the amount of light received to be regulated according to the color of the selecting screen interposed; it further enables the relative values of the colors in the various selected images to be made the same as in the corresponding image in natural colors. However the distance between the axes of the selected images of reduced dimensions renders it impossible to place side by side several distinct luminous sources.

In the present invention the displacement of the selected images on a positive film enables the said images to be placed at distances equal to those separating the luminous sources; these distances can be as large as is necessary. Owing to the distance between the centers of the projecting lenses it is possible to use lenses of a larger relative aperture and longer focal length and to place them in ordinary cylindrical fittings with an ordinary iris diaphragm.

In the accompanying drawings given by way of example: Figures 1 and 2 show, for a two-color film and for a three-color film, the arrangements by means of which it is possible to obtain, in accordance with the invention, the illumination of two or three selected images which must be superposed on the observation-screen for reconstructing the image in natural colors; the films A and B represent in each case the positive and negative films obtained for the purpose of making possible the illumination of the selected images according to the invention. Figs. 3–5 show diagrammatically printing devices, by means of which it is possible to obtain, with negatives such as B in which the $n$ selected images are grouped on the surface of an ordinary black-and-white image, such positives as A, in which the $n$ images are situated on the film at distances corresponding respectively to those separating the luminous projection sources. Fig. 6 is another modification of the printing device. Fig. 7 shows a number of films obtained by the application of the means shown in Fig. 6, the selected images occupying in this case the whole width of the film. Fig. 8 is another modified construction of the printing device. Fig. 9 shows diagrammatically modifications to be made in an ordinary projecting apparatus to use the films shown in Figs. 1, 2 and 7. Figs 10 and 11 show the means used for varying the time of exposure in accordance with the color of the filter and the value of the luminous absorption produced by the latter. Figs. 12, 13 and 14 are diagrams showing the position of the windows of the printing devices of Figs. 4, 5, and 6 respectively.

In accordance with the present invention, for the purpose of enabling the $n$ selected images, the superposition of which on the observation screen reproduces the image in natural colors to be uniformly lighted, the said images (the dimensions of which are such that the surface of the $n$ selected images should be at the outside equal to that of an image of an ordinary black-and-white film) are distributed on the film in such a manner that their distances correspond to the distance required for the arrangement of distinct luminous sources and the corresponding condensers. This makes it possible to use luminous sources of different power for lighting the $n$ selected images. In that way, if as an example the case of a two-color selection is taken, it will be seen that if $a$ (Fig. 1) indicates the vertical height which separates the axes of the projecting systems constituted by each luminous source, each condenser and each projecting lens, the corresponding images on the film, which must be projected simultaneously will also be separated by a distance equal to $a$. The difference in the distribution of the selected images on the negative film B obtained in the usual manner, and on the positive film A, can be readily seen in the case illustrated. The negative film B comprises, in the surface corresponding to that of an ordinary image in black, two selected images I and II taken at the same moment, while the corresponding images I II on the positive film A are at a distance equal to $a$. These selected images will be simultaneously projected and must coincide on the observation screen. The same would be the case with three-color selection. The three selected images occupying the surface of an ordinary image in the negative B, are separated on the positive, by the distance $a$ separating the axes of the three luminous sources 2 and of the corresponding condensers 1.

In order to obtain a film with selected images, in which the $n$ selected images are separated on the film by a distance equal to that separating the principal axes of the optical projection systems 2, 1, the following device could be used: The negative B (Figs. 1 and 2) is obtained in the usual manner, that is to say, the $n$ selected images I, II . . . which are taken simultaneously are grouped in the surface corresponding to that of an ordinary black-and-white image. Behind the negative B is placed the film A which must be printed upon in order to form the positive film (Fig. 3), the said film forming one or more loops 23 between the portions of the film which are applied behind the negative and intended to receive the corresponding selected images. The loop 23 has a length equal to $a$, the distance between the axes of the projecting systems, so that when the film is unfolded, it is easy to see that the images I, II . . . simultaneously taken, are separated by a distance equal to the length $a$ (Figs. 1 and 2). The positive and negative films are naturally given similar periodical movements.

It may be seen in Fig. 3 that the printing apparatus does not differ from similar known apparatus, except by the increased length of its printing aperture, for the purpose of providing it with the two windows through which appear the portions of the film to be printed, these windows and these superposed surfaces, in the construction illustrated, are lighted by distinct luminous sources, for instance Nernst lamps 24.

In practice, in order to obtain the positive images printed in a device similar to that shown in Fig. 3, as near together as possible, the arrangements shown in Fig. 4 (two colors) and in Fig. 5 (three colors) are used. In these printing devices, the positive film A', after having passed in front of the window 25, passes through a narrow slot made in the rear wall of the passage (Fig. 4). Its direction is changed so that it is brought at a right angle to the plane of the passage and passes over a driving drum 26 (Maltese cross or cog wheel) controlled by the unwinding mechanism. The film is then brought parallel to itself in order to enter the passage of the film through the same slot, or through another slot made in the bottom of the passage. The film thus passes in front of the second window 27, the part of the film situated outside the passage and passing over the drum 26, constituting the loop, having a length equal to $a$, which separates two selected images taken simultaneously through the windows 25, 27.

When it is necessary to take simultaneously three selected images, the film, after having formed a first loop 23, as in the preceding case, travels in front of the window 27 and enters a slot of the passage, enabling a second loop 28 to be formed, which embraces and drives the drum 26'. The film, on again entering the passage of the printing device, passes in front of a third window 29. Although the selected images are thus separated on the film, to the length of the loop 23, 28 separating the same, it will be seen that the points of view of the $n$ images simultaneously taken, are as near together as possible, which avoids any deformation and consequently cannot affect the superposition of the selected images on the observation screen. Moreover, instead of bringing back the upper and lower parts of the film in line with each other in the same passage of the apparatus (Figs. 4 and 5) the loop 23 can be formed so that the said parts are parallel to each other and placed side by side in different passages of the printing device (Fig. 6). The example in Fig. 6 shows that it is advantageous, for the purpose of bringing the points of view nearer together, to extend the images to the very edges of the film. In that way the films are obtained which differ from those hitherto used by the selected images occupying the whole width of the film, instead of being comprised as usual, between the marginal driving perforations. The perforations are then situated between the groups of $n$ images (Fig. 7) or, according to the arrangement of the latter, in the part of the film which the $n$ images do not cover. The use of printing devices forming loops on the positive can however be avoided, by using special means during the taking, so as to obtain a negative directly, the $n$ images of which, taken simultaneously, are arranged at a certain distance from each other as shown in the case of the positive A (Figs. 1 and 2). To that end, it is sufficient to cause the negative film to make a loop in the camera similar to that which the positive makes in the printing device. The positive is then printed by ordinary means.

For the purpose of projecting, an apparatus for black-and-white cinematography may be used, since the film with displaced images has the same amplitude of unwinding as an ordinary film. It is simply sufficient to add to this apparatus guiding windows and additional lenses which must be separated from each other and from the ordinary lens with which the apparatus is provided, by the distance separating the axes of the selected images which have to be projected simultaneously. As shown in Fig. 9 for the case of projection in two colors, it is sufficient to remove from the ordinary projecting apparatus the upper drum 20 supporting the film, and to replace it by a support 21. This support forms an extension of the passage of the apparatus and has one or more windows with the corresponding lenses. The drum receiving the film is simply put on and secured above the auxiliary support.

In order to insure, without it being necessary to set the lenses, perfect superposition of the selected images on the observation screen when subjects situated in very different planes (1 and 10 meters for instance) are projected, lenses 30 are inserted between the negative B and the unexposed positive film A. The images are therefore not printed by contact, but projected from the negative on to the sensitive film. To that end, the negative B and its passage are situated at a certain distance from the positive A and from its unwinding and guiding device (Fig. 8). Between the latter are inserted object glasses 30 which can be adjusted in every direction.

Before introducing the unexposed film A into the printing device, the negative B is caused to travel in the apparatus and, by means of the lenses 30 which can be suitably adjusted, superposition of negative images thus projected on to an observation screen placed at a suitable distance, is insured. When this superposition is obtained, the lenses 30 are locked in the relative positions which they occupy, the film A is introduced into the apparatus, and in front of the negative B, the projecting lamp is replaced by the luminous source generally used for printing films. The selected images are then projected from the negative B on to the film A, so that when the film thus obtained is introduced into the projecting apparatus, there is a certainty that an exact superposition of the selected images will be obtained on the observation screen, and consequently faithful reproduction of the animated image in its natural colors.

It will be understood that, by using the preceding means, it is possible, by previous adjustment of the lenses 30 belonging to the printing apparatus, to obtain a positive, the selected images of which will coincide exactly on the observation screen, without it being necessary to modify the setting of the lenses, whatever be the distance of the subject from the apparatus for taking the views.

Referring to Figs. 4 and 5, the windows 25, 27, 29 are so arranged that an oblique row of negative images is printed simultaneously—for instance the images (1, II), (2, III); (3, IV), etc., in the two-color film, and the images (1, II, $c$), (2 III, $d$), etc., in the three color film. The loops 23, or 23 and 28, must therefore be so adjusted that the widely separated positive images corresponding to a lateral row (2, II), or (2, II, $b$)—that is, to a simultaneously-taken set—will be separated by the distance $a$. In this way it is insured that the $n$ simultaneously taken positive images are also simultaneously projected. The diagonal arrangement of the printing windows in these two cases is shown in Figs. 12 and 13, the looped film being shown in dotted lines. Fig. 14 is a similar view showing that when the film is looped as in Fig. 6, there is no need to arrange the windows diagonally. The windows 25, 27, 29 may also be arranged so that any other oblique row of negative images is printed simultaneously, for instance (1, III), (2, IV), etc., in the two-color film, and (1, III, $e$) (2, IV, $f$), etc., in the three-color film.

As stated above, it is necessary for obtaining a correct reproduction of the colors, not only to light the selected images by luminous beams the intensity of which depends on the color of the selecting filter (which is obtained by the preceding means) but also to take into account the difference of sensitiveness of the emulsion to different colors passing through the said screens. As the sensitiveness of the film cannot be modified, the time of exposure of the various selected images is modified in accordance with the relative sensitiveness of the emulsion to light of the corresponding color. To that end, on the rotary shutter 31 (Fig. 10) which supports in the known manner the color-filters are arranged adjustable shutter-leaves 32 which enable the length of each of the colored segments 33 to be modified relatively to those with which they coöperate. In order to shift the said shutter-leaves 32 and to modify the useful length of each screen 33 and therefore the time of exposure, of the corresponding selected images, the said segment-shaped leaves are provided with grooves 34 which slide on screw-threaded pins provided with locking nuts 35 enabling them to be locked in the relative positions which they occupy after the regulation. When the rotary shutter 31 carries several series of colored screens, the distributions of which can be identical or different, it is preferable to arrange the shutter-leaves 32 regulating in each group the length of the filters of the same color, so that they are simultaneously given equal angular movements. To that end, the segment-shaped shutter-leaves 32 corresponding to the filters 33 of the same color, can be supported by arms 37 arranged radially around a central hub 36. The angular movement of the whole of this, relatively to the shutter 31 and to the filters supported by the latter, thus enables the time of exposure of the image to be varied to a corresponding extent, for the purpose of compensating for the differences in sensitiveness of the emulsion to light of various colors.

What I claim as my invention and desire to secure by Letters Patent is:—

1. An apparatus for printing positive cinematograph films from negative films having a plurality of selected images grouped on each standard picture-area, comprising passages adapted to guide the positive and negative films, means comprising sprocket wheels for driving said films, means for maintaining a loop in the positive film, windows in said passages adapted to expose parts of the films adjacent either end of said loop, whereby images can be printed wide apart on the positive film from images close together on the negative film.

2. An apparatus for printing positive cinematograph films from negative films having a plurality of selected images grouped on each standard picture-area comprising passages adapted to guide the positive and negative films, means comprising sprocket wheels for driving said films, means for maintaining a plurality of loops in the positive film, windows in said passages adapted to expose parts of the films adjacent either end of each loop, whereby images can be printed wide apart on the positive film from images close together on the negative film.

3. An apparatus for printing positive cinematograph films from negative films having a plurality of selected images grouped on each standard picture-area, comprising separate passages adapted to guide the positive and negative films, means comprising sprocket wheels for driving said films, means for maintaining a loop in the positive film, windows in said passages adapted to expose parts of the positive film adjacent either end of said loop, lenses situated between the two films adapted to project the images on the negative film on to the positive film, and means for adjusting said lenses to correct parallax error introduced during the taking of the negative images, for the purpose described.

4. An apparatus for printing positive cinematograph films from negative films having a plurality of selected images grouped on each standard picture-area, comprising separate passages adapted to guide the positive and negative films, means comprising sprocket wheels for driving said films, means for maintaining a plurality of loops in the positive film, windows in said passages adapted to expose parts of the positive film adjacent either end of each loop, lenses situated between the two films adapted to project the images on the negative film on to the positive film, and means for adjusting said lenses to correct parallax error introduced during the taking of the negative images, for the purpose described.

5. An apparatus for printing positive cinematograph films from negative films having a plurality of selected images grouped on each standard picture-area, comprising passages adapted to guide the positive and negative films, means comprising sprocket wheels for driving said films, means for maintaining a loop in the positive film, windows in said passages adapted to expose parts of the film, said parts being normally separated by a distance equal to the length of the film comprising the loop, whereby images can be printed wide apart on the positive film from images close together on the negative film.

In testimony whereof I have signed my name to this specification in the presence of two subscribing witnesses.

PIERRE ULYSSE.

Witnesses:
  LUCILE OUNDRY,
  D. A. MATERNUTZ.